(12) United States Patent
Byrne et al.

(10) Patent No.: US 9,436,485 B2
(45) Date of Patent: *Sep. 6, 2016

(54) SYNCHRONIZATION OF DATA BETWEEN AN ELECTRONIC COMPUTING MOBILE DEVICE AND AN ELECTRONIC COMPUTING DOCKSTATION

(75) Inventors: William T. Byrne, Raleigh, NC (US); Robert J. Christopher, Chapel Hill, NC (US); Paul D. Kangas, Raleigh, NC (US); Daniel M. Ranck, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/535,650

(22) Filed: Jun. 28, 2012

(65) Prior Publication Data

US 2013/0042035 A1 Feb. 14, 2013

Related U.S. Application Data

(63) Continuation of application No. 13/205,779, filed on Aug. 9, 2011.

(51) Int. Cl.
*G06F 9/445* (2006.01)
*G06F 17/30* (2006.01)

(52) U.S. Cl.
CPC ......... *G06F 9/445* (2013.01); *G06F 17/30174* (2013.01)

(58) Field of Classification Search
CPC ............ G06F 13/00; G06F 9/00; G06F 9/24; G06F 9/44; G06F 9/4403; G06F 9/4405; G06F 9/4406; G06F 9/441; G06F 9/445; G06F 9/44505; G06F 9/4451; G06F 1/24; G06F 17/30174

USPC ........................ 710/300–304; 713/100, 375; 712/228–229
See application file for complete search history.

(56) References Cited

U.S. PATENT DOCUMENTS 5,625,829 A * 4/1997 Gephardt et al. ............. 710/104
5,862,349 A * 1/1999 Cho et al. ..................... 710/304

(Continued)

OTHER PUBLICATIONS

Strickland, Jonathan. "How Cloud Storage Works" Online Apr. 30, 2008. HowStuffWorks.com. <http://computer.howstuffworks.com/cloud-computing/cloud-storage.htm> Retrieved from Internet Sep. 5, 2012.*

(Continued)

*Primary Examiner* — Thomas J Cleary
(74) *Attorney, Agent, or Firm* — Brandon C. Kennedy; Grant A. Johnson; Kennedy Lenart Spraggins LLP

(57) ABSTRACT

Methods, apparatuses, and computer program products are provided for synchronization of data between an electronic mobile device and an electronic computing dockstation. Embodiments include detecting, by the dockstation, completion of a docking procedure connecting the mobile device to the dockstation; identifying, by the dockstation, applications that are open on the mobile device; opening, by the dockstation, the identified applications on the dockstation; identifying, by the dockstation, files that are open on the mobile device; syncing, by the dockstation, the identified files with corresponding files within the dockstation, including updating an existing file within the dockstation; and opening on the dockstation, by the dockstation, the synced files with the open applications on the dockstation.

8 Claims, 6 Drawing Sheets

(56) References Cited

U.S. PATENT DOCUMENTS

| | | | |
|---|---|---|---|
| 6,324,544 B1 | 11/2001 | Alam et al. | |
| 6,438,622 B1* | 8/2002 | Haghighi et al. | 710/1 |
| 6,549,968 B1* | 4/2003 | Hart | 710/303 |
| 6,804,740 B1* | 10/2004 | Watts, Jr. | 710/303 |
| 7,386,855 B2 | 6/2008 | Song et al. | |
| 2003/0112585 A1 | 6/2003 | Silvester | |
| 2004/0199697 A1* | 10/2004 | Meynard | 710/303 |
| 2005/0038988 A1* | 2/2005 | Himmel et al. | 713/100 |
| 2008/0215758 A1 | 9/2008 | Gerdes et al. | |

OTHER PUBLICATIONS

Tan, Su-Lim, et al. Real-time operating system (RTOS) for small (16-bit) microcontroller. 2009. IEEE. The 13$^{th}$ IEEE International Symposium on Consumer Electronics (ISCE2009). pp. 1007-1011.*

* cited by examiner

SYNCHRONIZATION OF DATA BETWEEN AN ELECTRONIC COMPUTING MOBILE DEVICE AND AN ELECTRONIC COMPUTING DOCKSTATION

CROSS-REFERENCE TO RELATED APPLICATION

This application is a continuation application of and claims priority from U.S. patent application Ser. No. 13/205,779, filed on Aug. 9, 2011.

BACKGROUND OF THE INVENTION

1. Field of the Invention

The field of the invention is data processing, or, more specifically, methods, apparatus, and products for synchronization of data between an electronic computing mobile device and an electronic computing dockstation.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One emerging area of software is in the unique merging of the functions between mobile devices and a dockstation to leverage the capabilities of both when docked together. When docked together, the display of a mobile device may be used by the combined system for the display of data processed by the dockstation and the dockstation may be linked to the processing resources of the mobile device for parallel processing. To effectively utilize all of the capabilities of the combined system, however, the combined system may require synchronization of data between the mobile device and the dockstation.

SUMMARY OF THE INVENTION

Methods, apparatuses, and computer program products are provided for synchronization of data between an electronic mobile device and an electronic computing dockstation. Embodiments include detecting, by the dockstation, completion of a docking procedure connecting the mobile device to the dockstation; identifying, by the dockstation, applications that are open on the mobile device; opening, by the dockstation, the identified applications on the dockstation; identifying, by the dockstation, files that are open on the mobile device; syncing, by the dockstation, the identified files with corresponding files within the dockstation, including updating an existing file within the dockstation; and opening on the dockstation, by the dockstation, the synced files with the open applications on the dockstation.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1A:
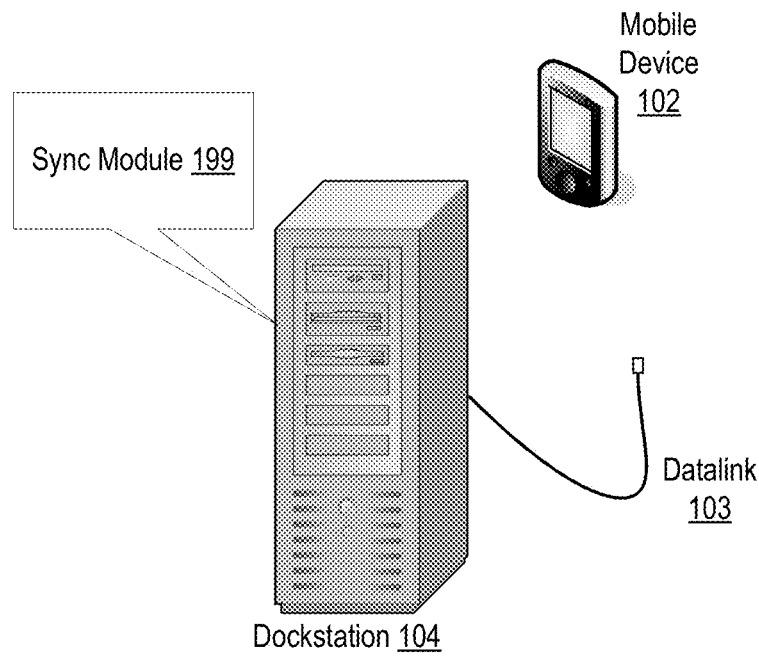
FIG. 1A sets forth a diagram of a mobile device and a dockstation that are in an undocked configuration according to embodiments of the present invention.

Exemplary methods, apparatus, and products for synchronization of data between an electronic computing mobile device and an electronic computing dockstation in accordance with the present invention are described with reference to the accompanying drawings, beginning with FIG. 1A. FIG. 1A sets forth a diagram of a mobile device (102) and a dockstation (104) that are in the undocked configuration according to embodiments of the present invention. A mobile device is an electronic computing device capable of processing data independent of a dockstation. Examples of mobile devices include personal digital assistant (PDA), mobile phones, tablets, and laptops. A dockstation is an electronic computing device capable of processing data and typically includes more processing power than a mobile device. Examples of dockstations include a blade server, high-performance computing systems, a desktop computer with no monitor, and others as will occur to those of skill in the art. In the undocked configuration, both the mobile device (102) and the dockstation (104) each rely on their own internal resources to process data.

In the example of FIG. 1A, a datalink (103) is illustrated as connected to the dockstation (104) and disconnected from the mobile device (102). A datalink is a high-speed interface capable of syncing data between the mobile device (102) and the dockstation (104). Examples of datalinks include links utilizing universal serial bus (USB) 3.0 protocol, Thunderbolt protocol, and other high-speed I/O standards as will occur to those of skill in the art.

The dockstation (104) of FIG. 1A includes a sync module (199) that enables synchronization of data between the mobile device (102) and the dockstation (104). The sync module (199) is configured to utilize the datalink (103) to control communication of data between the mobile device (102) and the dockstation (104) when the mobile device (102) and the dockstation (104) are in the docked configuration. Specifically, the sync module (199) is configured to cause the dockstation (104) to: detect completion of a docking procedure connecting the mobile device (102) to the dockstation (104); identify applications that are open on the mobile device (102); open the identified applications on the dockstation (104); identify files that are open on the mobile device (102); sync the identified files with corresponding files within the dockstation (104), including update an existing file within the dockstation (104); and open on the dockstation (104) the synced files with the open applications on the dockstation (104).

The sync module (199) is also configured to cause the dockstation (104) to: detect initiation of an undocking procedure that disconnects the mobile device (102) from the dockstation (104); in response to the detection of the initiation of the undocking procedure, identify all applications open on the dockstation (104); open the identified applications on the mobile device (102); identify any files open on the dockstation (104); pre-sync the identified open files with corresponding files within a storage location; sync the pre-synced files within the storage location to corresponding files within the mobile device (102) including update an existing file within the mobile device (102); and open on the mobile device (102) the synced files on the mobile device (102).

Figure 1B:
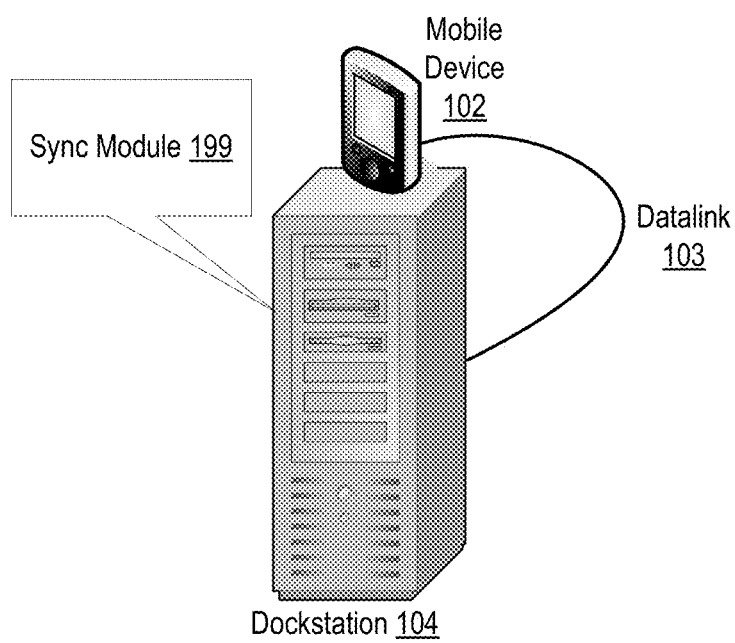
FIG. 1B sets forth a diagram of a mobile device and a dockstation that are in an docked configuration that allows for synchronization of data according to embodiments of the present invention.

FIG. 1B sets forth a diagram of a mobile device (102) and a dockstation (104) that are in the docked configuration allowing for synchronization of data according to embodiments of the present invention. In the docked configuration, the mobile device (102) and the dockstation (104) are mated together. In the example of FIG. 1B, this connection is implemented over the datalink (103). However, the mobile device (102) and the dockstation (104) may also be capable of wireless communication with each other for sharing and access of data and resources. That is, synchronization of data between the mobile device (102) and the dockstation (104) may be performed over a wireless connection. Depending on the particular implementation, the two computers (102, 104) may utilize hardware and/or software t in both the mobile device (102) and the dockstation (104) to form a type of distributed processing system.

Furthermore, when the mobile device (102) and the dockstation (104) are attached together, the dockstation (104) may be set to control all the components in the combined computers (102, 104). Similarly, the combined computers (102, 104) may be configured such that just the dockstation (104) is operating while the mobile device (102) is idle or off, except for the display of the mobile device (102). In alternative embodiments, the combined computers (102, 104) can be partitioned in any number of different ways and the actual components residing in the computers can vary and may or may not overlap. Even though the two computers (102, 104) have some redundant components, the operating systems and management software causes the devices in the system to operate in harmony and in particular during synchronization of data between the mobile device (102) and the dockstation (104).

Synchronization of data between an electronic computing mobile device and an electronic computing dockstation in accordance with the present invention is generally implemented with computers, that is, with automated computing machinery. In the system of FIG. 1, for example, the mobile device (102), the dockstation (104), and the sync module (199) are implemented to some extent at least as computers. For further explanation, therefore, FIG. 2 sets forth a block diagram of automated computing machinery comprising a sync module (199) within a dockstation (104) useful in synchronization of data between a mobile device (102) and the dockstation (104) according to embodiments of the present invention.

Figure 2:
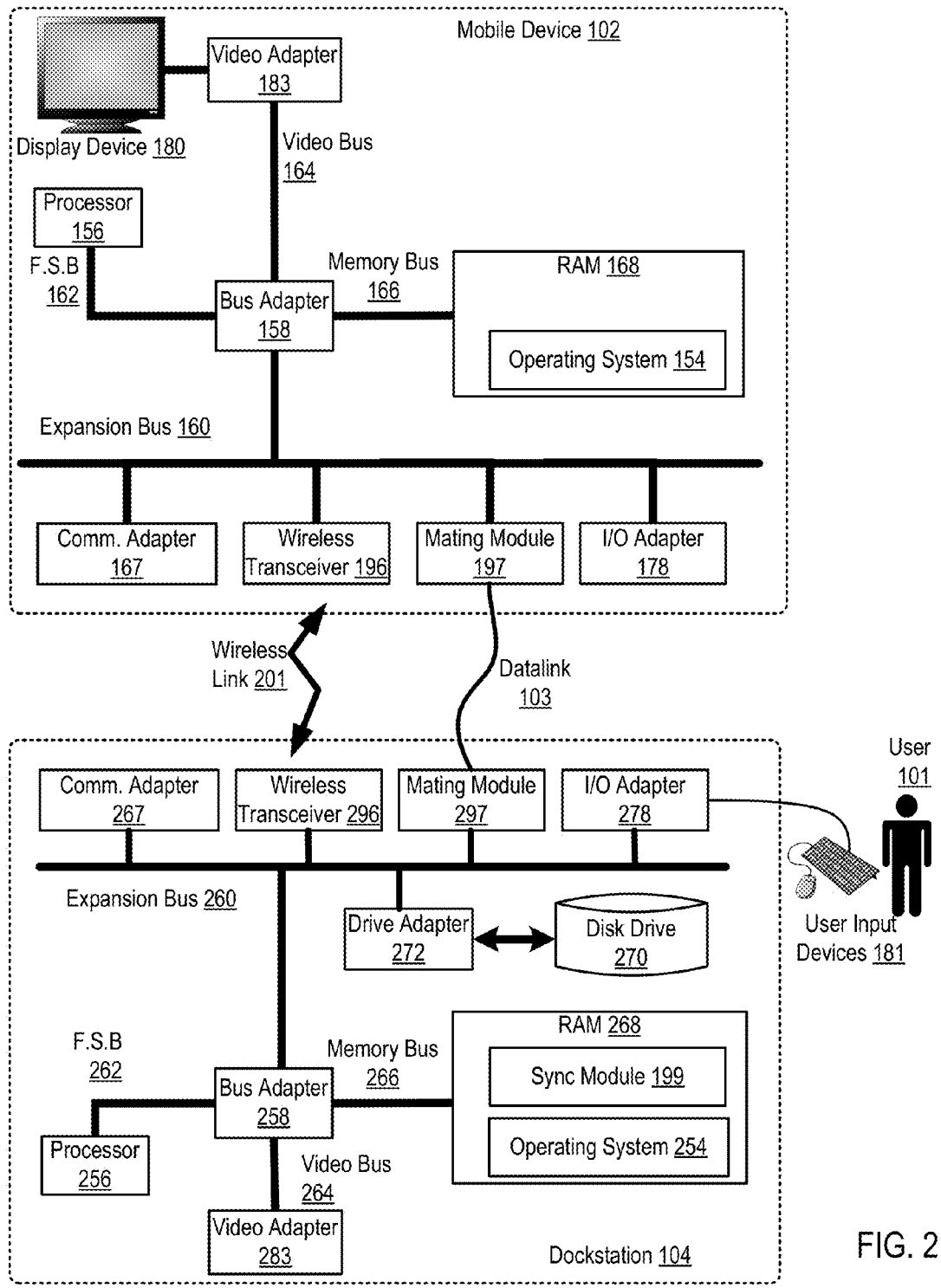
FIG. 2 sets forth a block diagram of automated computing machinery comprising a sync module within a dockstation useful in synchronization of data between a mobile device and the dockstation according to embodiments of the present invention.

The mobile device (102) of FIG. 2 includes at least one computer processor (156) or 'CPU' as well as random access memory (168) ('RAM') which is connected through a high speed memory bus (166) and bus adapter (158) to processor (156) and to other components of the computer (152). Stored in RAM (168) is an operating system (154). Operating systems useful synchronization of data between an electronic computing mobile device and an electronic computing dockstation according to embodiments of the present invention include UNIX™, Linux™, Microsoft XP™, AIX™, IBM's i5/OS™, and others as will occur to those of skill in the art. The operating system (154) in the example of FIG. 2 is shown in RAM (168), but many components of such software typically are stored in non-volatile memory also, such as, for example, on a disk drive.

The mobile device (102) of FIG. 2 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The mobile device (102) of FIG. 2 includes a video adapter (183), which is an example of an I/O adapter specially designed for graphic output to a display device (180) such as a display screen or a computer monitor. The video adapter (183) is connected to processor (156) through a high speed video bus (164), bus adapter (158), and the front side bus (162), which is also a high speed bus. The display device (180) may be a lightweight liquid crystal display (LCD) flat-panel display screen. The display device (180) may also comprise a touch-sensitive transparent panel covering the LCD screen to receive user input via the touch screen and to propagate the input data to the processor (156).

The mobile device (102) of FIG. 2 includes a communications adapter (167) for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for synchronization of data between an electronic computing mobile device and an electronic computing dockstation according to embodiments of the present invention include modems for wired dial-up communications, Ethernet (IEEE 802.3) adapters for wired data communications network communications, and 802.11 adapters for wireless data communications network communications.

The mobile device (102) also includes a mating module (197) and a wireless module (196) that are each coupled to the expansion bus (160). The mating module (197) of the mobile device (102) mates with a corresponding mating module (297) of the dockstation (104). The mating module (197) provides a physical connection between the mobile device (102) and the dockstation (104). When the computers (102, 104) are mated together in the docked configuration, the mating modules (197, 297) are to handle the sending and receiving of data, instructions, control signals, and power. Similarly, the wireless transceiver (196) of the mobile device (102) is to handle the sending and receiving of data and instructions with a wireless transceiver (296) of the dockstation (104). The wireless transceivers (196, 296) can form a wireless link (201) in accordance with a local area wireless protocol such as the IEEE 802.11a standard, IEEE 802.11b standard, or Bluetooth technology, for example. The wireless link (201) can be one of the standard wireless protocols or a proprietary, non-standard wireless interface. The wireless transceivers (196, 296), are not limited to communications with each other and may also communicate with other wireless devices.

The dockstation (104) of FIG. 2 includes at least one computer processor (256) or 'CPU' as well as random access memory (268) ('RAM') which is connected through a high speed memory bus (266) and bus adapter (258) to processor (256) and to other components of the dockstation (104).

The sync module (199) is stored in RAM (268) of the dockstation (104) and is useful in synchronization of data between the mobile device (102) and the dockstation (104). Specifically, the sync module (199) includes computer program instructions that when executed by the processor (256) cause the dockstation (104) to carry out the steps of: detecting, by the dockstation (104), completion of a docking procedure connecting the mobile device (102) to the dockstation (104); identifying, by the dockstation (104), applications that are open on the mobile device (102); opening, by the dockstation (104), the identified applications on the dockstation (104); identifying, by the dockstation (104), files that are open on the mobile device (102); syncing, by the dockstation (104), the identified files with corresponding files within the dockstation (104), including updating an existing file within the dockstation (104); and opening on the dockstation (104), by the dockstation (104), the synced files with the open applications on the dockstation (104).

The sync module (199) includes computer program instructions that when executed by the processor (256) cause the dockstation (104) to carry out the steps of: detecting, by the dockstation (104), initiation of an undocking procedure that disconnects the mobile device (102) from the dockstation (104); in response to the detection of the initiation of the undocking procedure, identifying, by the dockstation (104), all applications open on the dockstation (104); opening, by the dockstation (104), the identified applications on the mobile device (102); identifying, by the dockstation (104), any files open on the dockstation (104); pre-syncing, by the dockstation (104), the identified open files with corresponding files within a storage location; syncing, by the dockstation (104), the pre-synced files within the storage location to corresponding files within the mobile device (102) including updating an existing file within the mobile device (102); and opening on the mobile device (102), by the dockstation (104), the synced files on the mobile device (102).

Also stored in RAM (268) is an operating system (254). Operating systems useful synchronization of data between an electronic computing mobile device and an electronic computing dockstation according to embodiments of the present invention include UNIX™, Linux™, Microsoft XP™, AIX™, IBM's i5/OS™, and others as will occur to those of skill in the art. The operating system (254) and the sync module (199) in the example of FIG. 2 are shown in RAM (268), but many components of such software typically are stored in non-volatile memory also, such as, for example, on a disk drive.

The dockstation (104) of FIG. 2 includes disk drive adapter (272) coupled through expansion bus (260) and bus adapter (258) to processor (256) and other components of the computer (252). Disk drive adapter (272) connects non-volatile data storage to the dockstation (104) in the form of disk drive (270). Disk drive adapters useful in computers for synchronization of data between an electronic computing mobile device and an electronic computing dockstation according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The dockstation (104) of FIG. 2 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice.

The dockstation (104) of FIG. 2 includes a communications adapter (267) for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for synchronization of data between an electronic computing mobile device and an electronic computing dockstation according to embodiments of the present invention include modems for wired dial-up communications, Ethernet (IEEE 802.3) adapters for wired data communications network communications, and 802.11 adapters for wireless data communications network communications.

In a particular embodiment, when the mobile device (102) and dockstation (104) are joined together at the mating modules (197, 297), the docked configuration is a multiprocessor computer with the dockstation (104) having user input devices (181) and the mobile device (102) having a LCD display screen. In this docked configuration, a user (101) can set the computers (102, 104) to operate with a single processor or with multiple processors. For instance, if high performance or a large amount of computing power is needed, the docked computers (102, 104) may be set to operate with both processors (156, 256). The dockstation (104) can have a single processor or even multiple processors depending on the performance and power consumption requirements of the particular implementation. But if normal performance or greater power savings is desired, the docked computers (102, 104) may be set to operate with just one of the processors (156, 256). While the mobile device (102)

and the dockstation (104) are physically mated, data can be communicated over the datalink (103) and synchronized. Depending on the particular implementation, the data stored on the two computers (102, 104), may be identical or not.

When the mobile device (102) and the dockstation (104) are detached, each one has the capability to operate as stand-alone single processor computers. By physically detaching the mobile device (102) from the dockstation (104), the combined computers (102, 104) are converted into the separate mobile device (102) and the dockstation (104). Because the display of the combined computers (102, 104) resides with the mobile device (102), the dockstation (104) is left without a display when in the undocked configuration. A monitor can be coupled to the video adapter (283) of the dockstation (104) if a display is needed. In a particular embodiment, only one video adapter (183, 283) is necessary to operate the display device (180). When both video adapters (183, 283) are available in the docked configuration, one of the video adapters may be turned off to reduce power consumption. Similarly, other redundant components within the combined computers (102, 104) may be turned off in the docked configuration. In addition to the possible power savings, thermal output can also be reduced.

Even though the components in of the mobile device (102) and the dockstation (104) bear similar names, the exact functionality and form factor may not necessarily be identical. For instance, the components in the mobile device (102) may be optimized to be lightweight and low power, whereas the components in the dockstation (104) may be optimized for higher performance.

Furthermore, the particular operating systems (154, 254) executed on the mobile device (102) and the dockstation (104) may not be of the same version and/or type. For instance, the dockstation (104) may execute UNIX™, Linux™, Microsoft XP™, AIX™, IBM's i5/OS™, while the mobile device (102) may execute IOS™. The operating software of the mobile device (102) and the dockstation (104) should be compatible or at least able to communicate with each other.

Figure 3:
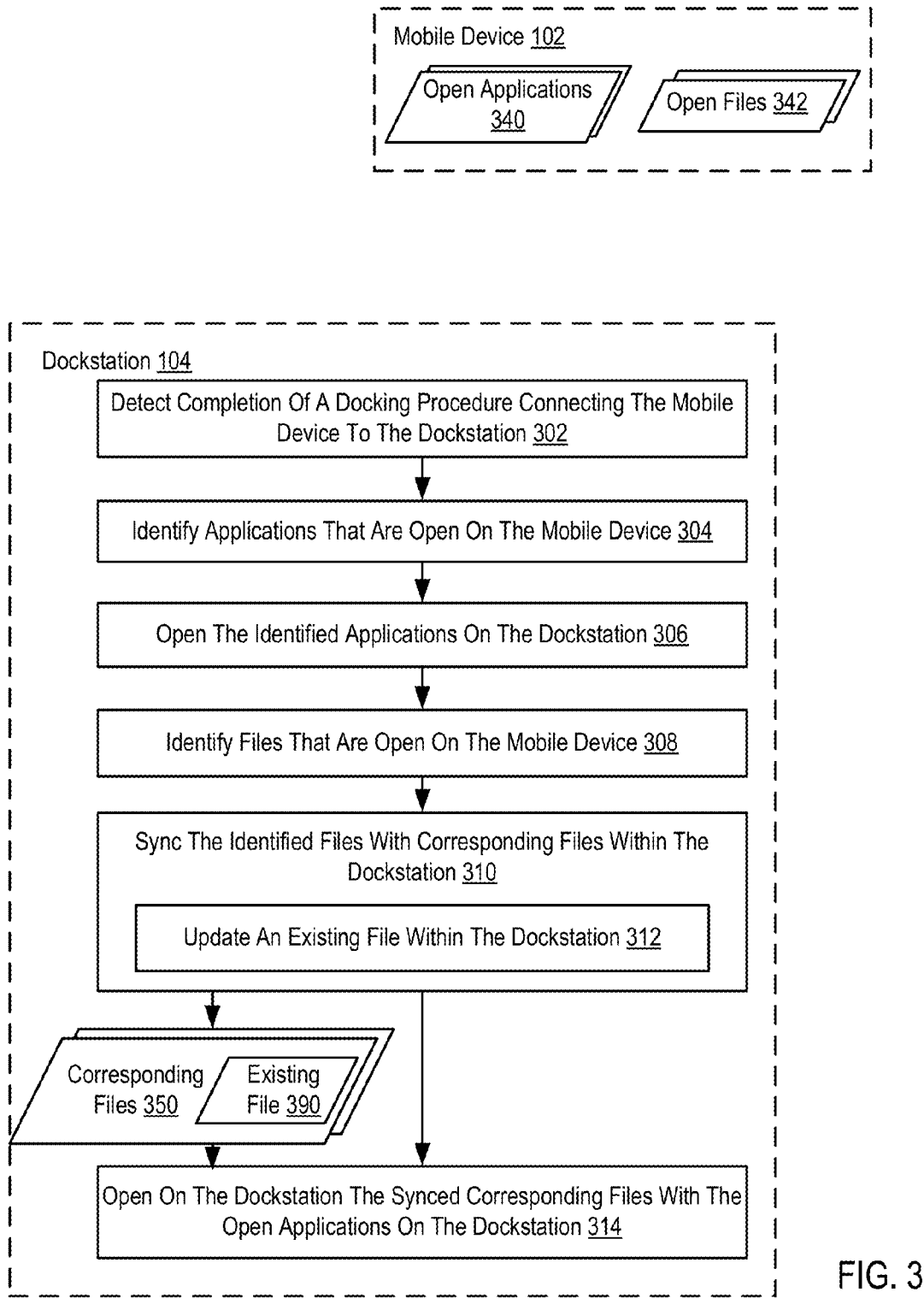
FIG. 3 sets forth a flow chart illustrating an exemplary method for synchronization of data between an electronic computing mobile device and an electronic computing dockstation according to embodiments of the present invention.

For further explanation, FIG. 3 sets forth a flow chart illustrating an exemplary method for synchronization of data between an electronic computing mobile device and an electronic computing dockstation according to embodiments of the present invention. The method of FIG. 3 includes detecting (302), by the dockstation (104), completion of a docking procedure connecting the mobile device (102) to the dockstation (104). As part of the docking procedure, the dockstation (104) and the mobile device (102) may engage in a handshaking process between mating modules of the mobile device (102) and the dockstation (104). Detecting (302) completion of a docking procedure connecting the mobile device (102) to the dockstation (104) may be carried out by detecting electrical contact between mating modules of the dockstation (104) and the mobile device (102); and receiving an indication or message from the mobile device or a component within the dockstation (104) indicating that a connection between the mobile device (102) and the dockstation (104) has been established.

The method of FIG. 3 includes identifying (304), by the dockstation (104), applications (340) that are open on the mobile device (102). Identifying (304) applications (340) that are open on the mobile device (102) may be carried out by examining one or more variables within the memory of the mobile device (102) that indicate the applications that are open; receiving a message from the mobile device (102) indicating the applications that are open on the mobile device (102); and storing within the dockstation (104) indications of the applications that are open.

The method of FIG. 3 includes opening (306), by the dockstation (104), the identified applications (340) on the dockstation (104). Opening (306) the identified applications (340) on the dockstation (104) may be carried out by determining an application on the dockstation (104) that corresponds with the identified application on the mobile device (102). For example, the mobile device (102) may utilize a less powerful version of an application on the dockstation (104). As part of the process for opening the identified applications on the dockstation (104), the dockstation (104) determines if a corresponding application must be used.

The method of FIG. 3 includes identifying (308), by the dockstation (104), files (342) that are open on the mobile device (102). Identifying (308) files (342) that are open on the mobile device (102) may be carried out by examining one or more variables within the memory of the mobile device (102) to determine whether one or more files are open; receiving a message from the mobile device (102) indicating the files that are open on the mobile device; and storing within the dockstation (104) indications of the files that are open.

The method of FIG. 3 includes syncing (310), by the dockstation (104), the identified files (342) with corresponding files (350) within the dockstation (104). Syncing (310), by the dockstation (104), the identified files (342) with corresponding files (350) within the dockstation (104) may be carried out by changing the corresponding file on the dockstation (104) to match the opened file on the mobile device (102). In the method of FIG. 3, syncing (310) the identified files (342) with corresponding files (350) within the dockstation (104) includes updating (312) an existing file (390) within the dockstation (104). Updating (312) an existing file (390) within the dockstation (104) may be carried out by generating a delta file that indicates the changes between the identified file on the mobile device (102) and the corresponding file on the dockstation (104); and changing the corresponding file within the dockstation (104) based on the delta file.

The method of FIG. 3 includes opening (314) on the dockstation (104), by the dockstation (104), the synced corresponding files (350) with the open applications on the dockstation (104). Opening (314) on the dockstation (104) the synced corresponding files (350) with the open applications on the dockstation (104) may be carried out by executing the corresponding file on the dockstation (104) using one of the open applications.

Figure 4:
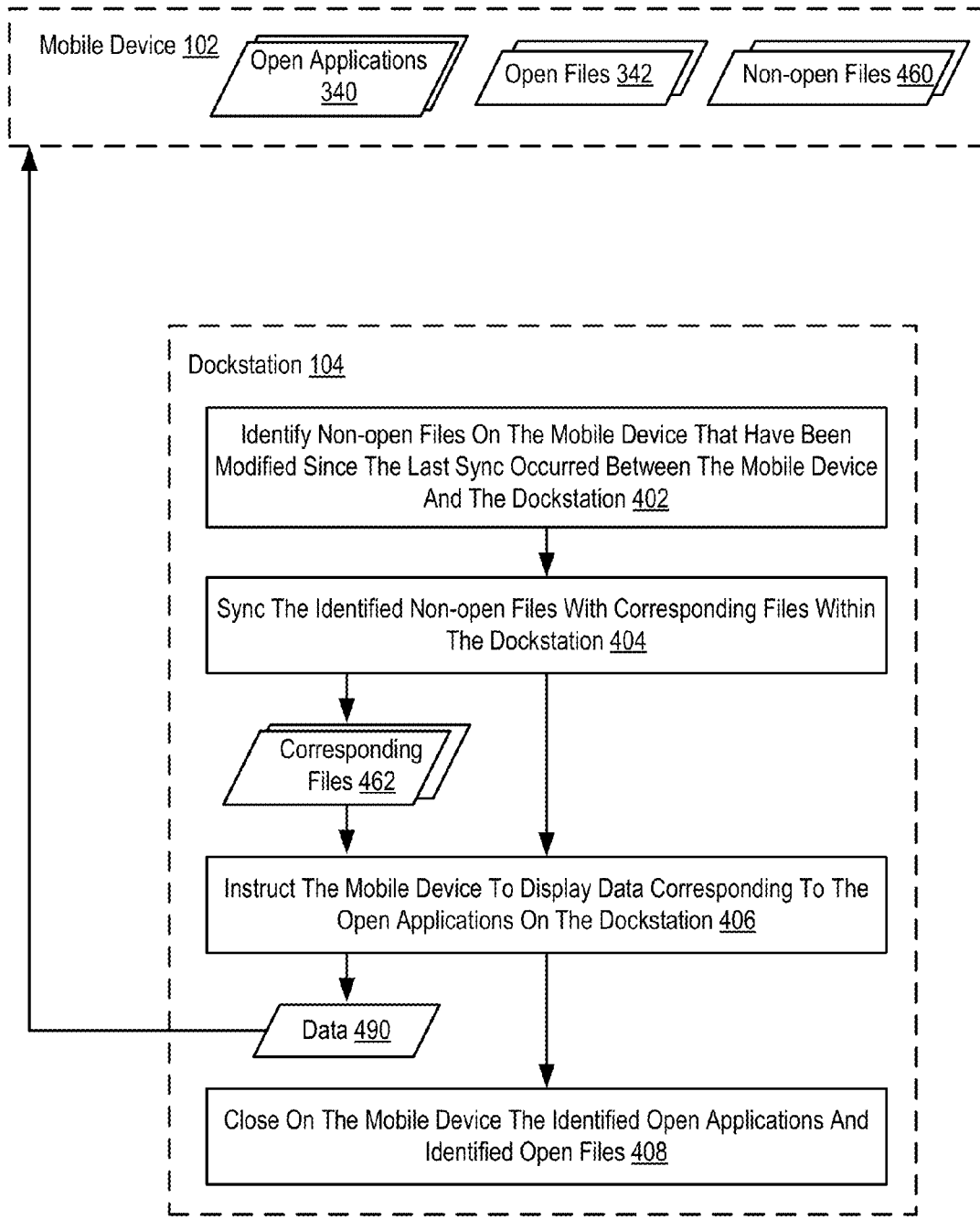
FIG. 4 sets forth a flow chart illustrating a further exemplary method for synchronization of data between an electronic computing mobile device and an electronic computing dockstation according to embodiments of the present invention.

For further explanation, FIG. 4 sets forth a flow chart illustrating a further exemplary method for synchronization of data between an electronic computing mobile device and an electronic computing dockstation according to embodiments of the present invention. The method of FIG. 4 includes identifying (402), by the dockstation (104), non-open files (460) on the mobile device (102) that have been modified since the last sync occurred between the mobile device (102) and the dockstation (104). Identifying (402) non-open files (460) on the mobile device (102) that have been modified since the last sync occurred between the mobile device (102) and the dockstation (104) may be carried out by examining one or more variables within the memory of the mobile device (102) that indicate a timestamp or otherwise type of dating indicating when the last update of the file occurred; comparing the timestamp to a timestamp indicating when the last sync between the mobile device (102) and the dockstation (104) occurred; and storing an indication of which non-open files need updating.

The method of FIG. 4 also includes syncing (404), by the dockstation (104), the identified non-open files (460) with corresponding files (462) within the dockstation (104). Syncing (404) the identified non-open files (460) with corresponding files (462) within the dockstation (104) may be carried out by changing the corresponding file on the dockstation (104) to match the non-open file on the mobile device (102).

The method of FIG. 4 also includes instructing (406), by the dockstation (104), the mobile device (102) to display data (490) corresponding to the open applications on the dockstation (104). Instructing (406) the mobile device (102) to display data (490) corresponding to the open applications on the dockstation (104) may be carried out by transmitting the data (490) to a video adapter on the mobile device (102).

The method of FIG. 4 also includes closing (408) on the mobile device (102), by the dockstation (104), the identified open applications (340) and identified open files (342). Closing (408) on the mobile device (102) the identified open applications (340) and identified open files (342) may be carried out by transmitting a message from the dockstation (104) to the mobile device (102) instructing the mobile device (102) to close one or more applications and one or more open files.

Figure 5:
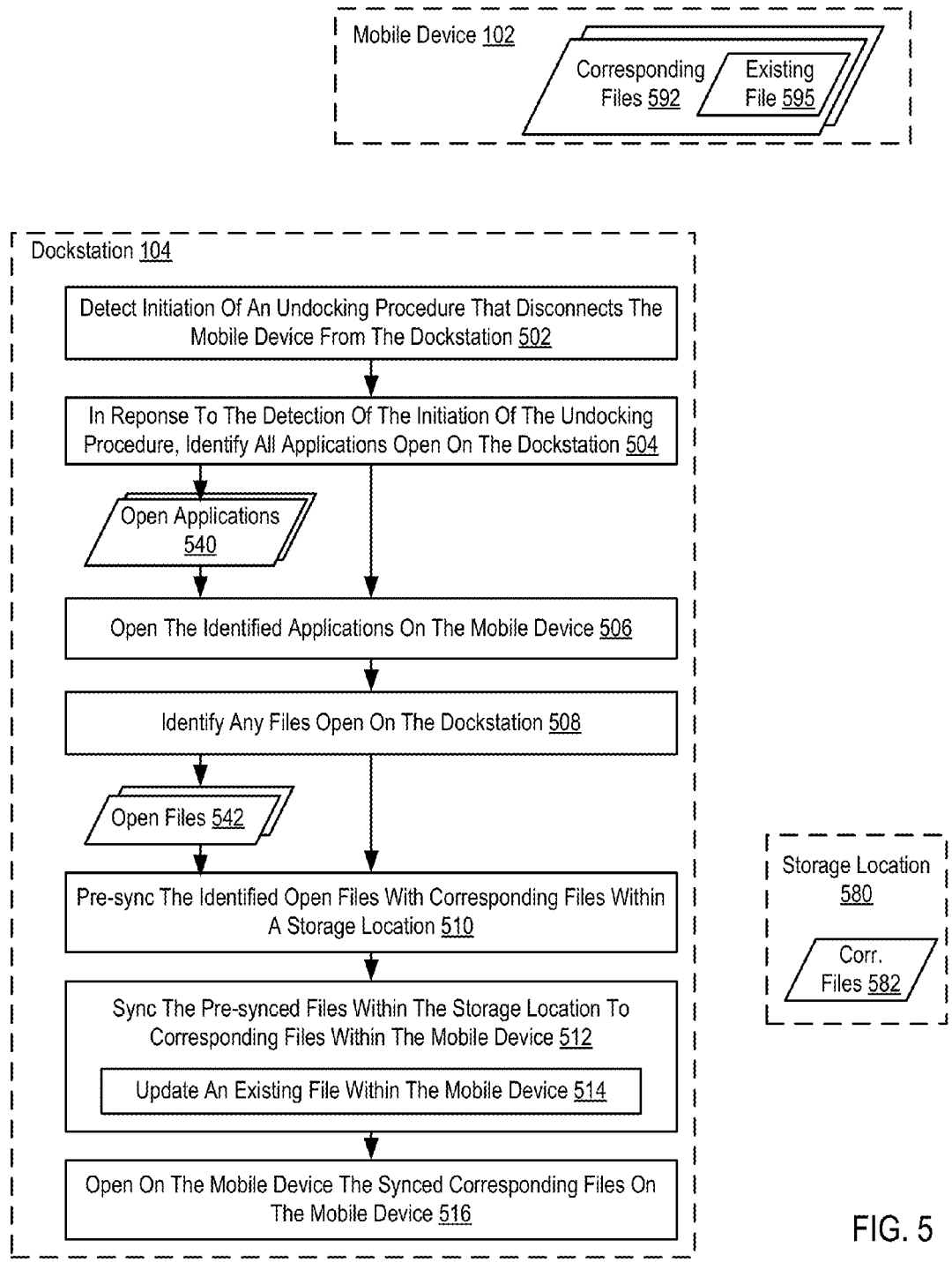
FIG. 5 sets forth a flow chart illustrating a further exemplary method for synchronization of data between an electronic computing mobile device and an electronic computing dockstation according to embodiments of the present invention.

For further explanation, FIG. 5 sets forth a flow chart illustrating a further exemplary method for synchronization of data between an electronic computing mobile device and an electronic computing dockstation according to embodiments of the present invention. The method of FIG. 5 includes detecting (502), by the dockstation (104), initiation of an undocking procedure that disconnects the mobile device (102) from the dockstation (104). Detecting (502) initiation of an undocking procedure that disconnects the mobile device (102) from the dockstation (104) may be carried out by detecting depression of a button on one of the dockstation (104) and the mobile device (102); and receiving an indication via a user interface.

The method of FIG. 5 includes in response to the detection of the initiation of the undocking procedure, identifying (504), by the dockstation (104), all applications (540) open on the dockstation (104). Identifying (504) all applications (540) open on the dockstation (104) may be carried out by examining one or more variables within the memory of the dockstation (104) that indicate the applications that are open; receiving a message from a component of the dockstation (104) indicating the applications that are open on the dockstation (104); and storing within the dockstation (104) indications of the applications that are open.

The method of FIG. 5 includes opening (506), by the dockstation (104), the identified applications (540) on the mobile device (102). Opening (506) the identified applications (540) on the mobile device (102) may be carried out by determining an application on the mobile device (102) that corresponds with the identified application on the dockstation (104). For example, the mobile device (102) may utilize a less powerful version of an application on the dockstation (104). As part of the process for opening the identified applications on the dockstation (104), the dockstation (104) determines if a corresponding application on the mobile device (102) must be used.

The method of FIG. 5 includes identifying (508), by the dockstation (104), any files (542) open on the dockstation (104). Identifying (508) any files (542) open on the dockstation (104) may be carried out by examining one or more variables within the memory of the dockstation (104) that indicate the files that are open; receiving a message from a component of the dockstation (104) indicating the files that are open on the dockstation (104); and storing within the dockstation (104) indications of the files that are open.

The method of FIG. 5 includes pre-syncing (510), by the dockstation (104), the identified open files (542) with corresponding files (582) within a storage location (580). A storage location may be within the dockstation (104) or on an external drive such as a cloud storage device on an external server. Pre-syncing (510) the identified open files (542) with corresponding files (582) within a storage location (580) may be carried out by generating a delta file including changes between an open file and a corresponding file within the storage location; changing the corresponding file based on the delta file; and storing the corresponding file within the storage location.

The method of FIG. 5 includes syncing (512), by the dockstation (104), the pre-synced files (542) within the storage location (580) to corresponding files (590) within the mobile device (102). Syncing (512) the pre-synced files (542) within the storage location (580) to corresponding files (590) within the mobile device (102) may be carried out by changing the corresponding file on the mobile device (102) to match the pre-synced corresponding file within the storage device.

In the method of FIG. 5, syncing (512) the pre-synced files (542) within the storage location (580) to corresponding files (590) within the mobile device (102) includes updating (514) an existing file (595) within the mobile device (102). Updating (514) an existing file (595) within the mobile device (102) may be carried out by generating a delta file that indicates the changes between the identified file on the mobile device (102) and the corresponding file on the dockstation (104); and changing the corresponding file within the mobile device (102) based on the delta file.

The method of FIG. 5 includes opening (516) on the mobile device (102), by the dockstation (104), the synced corresponding files (592) on the mobile device (102). Opening (516) on the mobile device (102) the synced corresponding files (592) on the mobile device (102) may be carried out by executing the corresponding file on the mobile device (102) using one of the open applications.

Figure 6:
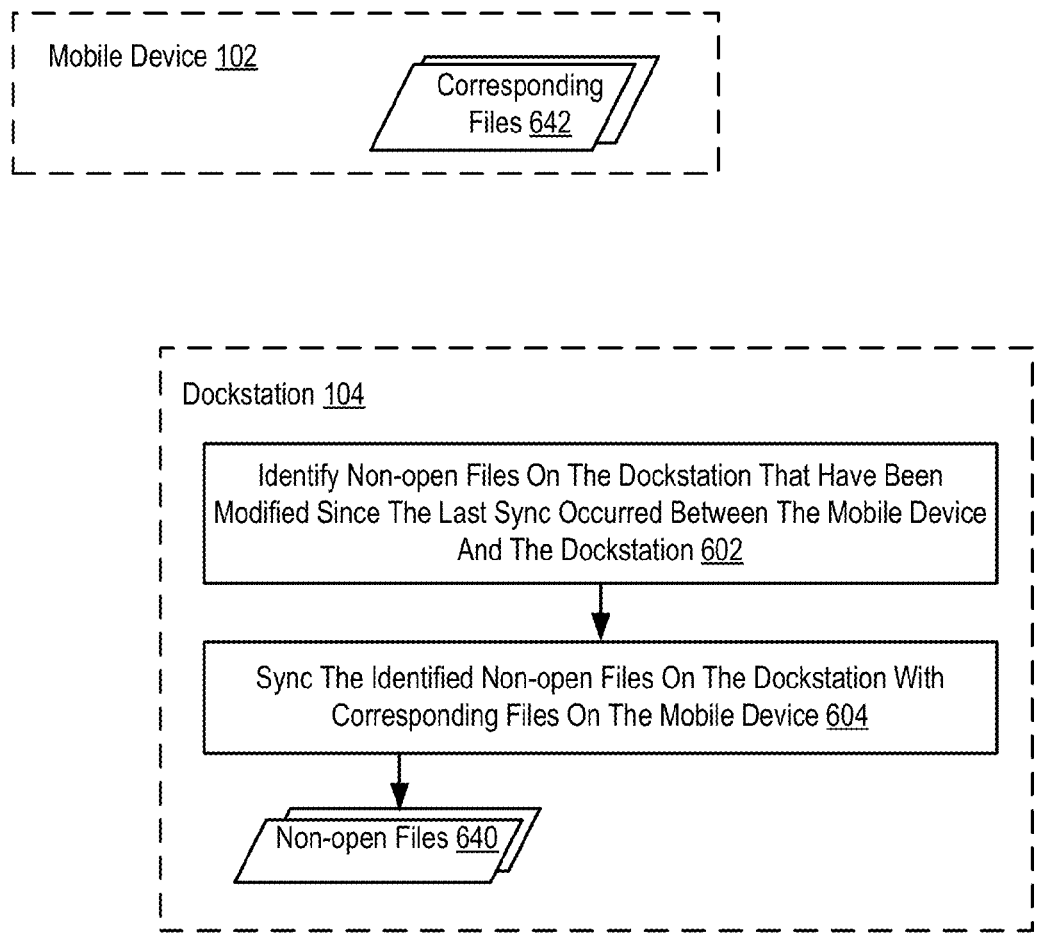
FIG. 6 sets forth a flow chart illustrating a further exemplary method for synchronization of data between an electronic computing mobile device and an electronic computing dockstation according to embodiments of the present invention.

For further explanation, FIG. 6 sets forth a flow chart illustrating a further exemplary method for synchronization of data between an electronic computing mobile device and an electronic computing dockstation according to embodiments of the present invention. The method of FIG. 6 includes identifying (602), by the dockstation (104), non-open files (640) on the dockstation (104) that have been modified since the last sync occurred between the mobile device (102) and the dockstation (104). Identifying (602) non-open files (640) on the dockstation (104) that have been modified since the last sync occurred between the mobile device (102) and the dockstation (104) may be carried out by examining one or more variables within the memory of the dockstation (104) that indicate a timestamp or otherwise type of dating indicating when the last update of the file occurred; comparing the timestamp to a timestamp indicating when the last sync between the mobile device (102) and the dockstation (104) occurred; and storing an indication of which non-open files need updated.

The method of FIG. 6 includes syncing (604), by the dockstation (104), the identified non-open files (640) on the dockstation (104) with corresponding files (642) on the mobile device (102). Syncing (604) the identified non-open files (640) on the dockstation (104) with corresponding files (642) on the mobile device (102) may be carried out by changing the corresponding file on the mobile device (102) to match the non opened file on the dockstation (104).

Exemplary embodiments of the present invention are described largely in the context of a fully functional computer system for synchronization of data between an electronic computing mobile device and an electronic computing dockstation. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of synchronization of data between an electronic mobile device and an electronic computing dockstation, the method comprising:
    detecting, by the dockstation executing only a first type of operating system, completion of a docking procedure connecting the mobile device to the dockstation, wherein the mobile device executes only a second type of operating system, wherein both the dockstation and the mobile device have the capability to operate as stand-alone computers;
    identifying, by the dockstation, applications that are open on the mobile device;
    opening, by the dockstation, the identified applications on the dockstation, wherein the applications on the mobile device are different versions of the corresponding applications on the dockstation;
    identifying, by the dockstation, files that are open on the mobile device;
    syncing, by the dockstation, the identified files with corresponding files within the dockstation, including updating an existing file within the dockstation; and
    opening on the dockstation, by the dockstation, the synced corresponding files with the open applications on the dockstation.

2. The method of claim 1 further comprising:
    identifying, by the dockstation, non-open files on the mobile device that have been modified since the last sync occurred between the mobile device and the dockstation; and
    syncing, by the dockstation, the identified non-open files with corresponding files within the dockstation.

3. The method of claim 1 further comprising instructing, by the dockstation, the mobile device to display data corresponding to the open applications on the dockstation.

4. The method of claim 1 further comprising closing on the mobile device, by the dockstation, the identified open applications and identified open files.

5. A method of synchronization of data between an electronic mobile device and an electronic computing dockstation, the method comprising:
    detecting, by the dockstation executing only a first type of operating system, initiation of an undocking procedure that disconnects the mobile device from the dockstation, wherein the mobile device executes only a second type of operating system, wherein both the dockstation and the mobile device have the capability to operate as stand-alone computers;
    in response to the detection of the initiation of the undocking procedure, identifying, by the dockstation, all applications open on the dockstation;
    opening, by the dockstation, the identified applications on the mobile device, wherein the applications on the mobile device are different versions of the corresponding applications on the dockstation;
    identifying, by the dockstation, any files open on the dockstation;
    pre-syncing, by the dockstation, the identified open files with corresponding files within a storage location;
    syncing, by the dockstation, the pre-synced files within the storage location to corresponding files within the mobile device including updating an existing file within the mobile device; and
    opening on the mobile device, by the dockstation, the synced corresponding files on the mobile device.

6. The method of claim 5 further comprising:
    identifying, by the dockstation, non-open files on the dockstation that have been modified since the last sync occurred between the mobile device and the dockstation; and
    syncing, by the dockstation, the identified non-open files on the dockstation with corresponding files on the mobile device.

7. The method of claim 5 wherein the storage location is within the dockstation.

8. The method of claim 5 wherein the storage location is within a cloud storage device that is external to the dockstation and the mobile device.

* * * * *